US005792721A

United States Patent [19]
Grate et al.

[11] Patent Number: 5,792,721
[45] Date of Patent: Aug. 11, 1998

[54] PREPARATION OF PHOSPHOMOLYBDOVANADATE POLYOXOANIONS

[75] Inventors: John H. Grate; David R. Hamm, both of Mountain View, Calif.; Robert J. Saxton, West Chester, Pa.

[73] Assignee: Catalytica, Inc., Mountain View, Calif.

[21] Appl. No.: 336,622

[22] Filed: Nov. 9, 1994

Related U.S. Application Data

[63] Continuation of Ser. No. 675,937, Sep. 4, 1992, abandoned, which is a continuation-in-part of Ser. No. 489,806, Mar. 5, 1990, abandoned.

[51] Int. Cl.$^6$ .......................... B01J 27/18; B01J 37/04; B01J 37/28
[52] U.S. Cl. .......................... 502/209; 423/306
[58] Field of Search .......................... 502/209; 423/306

[56] References Cited

U.S. PATENT DOCUMENTS

| | | | |
|---|---|---|---|
| 3,119,875 | 1/1964 | Steinmetz et al. | 568/401 |
| 3,122,586 | 2/1964 | Berndt et al. | 568/401 |
| 3,154,586 | 10/1964 | Bander et al. | 502/24 X |
| 3,485,877 | 12/1969 | Hurgis et al. | 502/201 X |
| 4,146,574 | 3/1979 | Onada et al. | 423/306 X |
| 4,404,397 | 9/1983 | Danial | 502/211 X |
| 4,434,082 | 2/1984 | Murtha et al. | 502/164 |
| 4,448,892 | 5/1984 | Kukes et al. | 502/164 |
| 4,507,506 | 3/1985 | Shioyama | 502/103 |
| 4,507,507 | 3/1985 | Murtha | 568/401 |
| 4,532,362 | 7/1985 | Kukes et al. | 568/401 |
| 4,550,212 | 10/1985 | Shioyama | 502/102 |
| 4,720,474 | 1/1988 | Vasilevskis et al. | 502/209 X |
| 4,720,575 | 1/1988 | Gruber | 423/306 X |
| 4,723,041 | 2/1988 | Vasilevskis et al. | 568/401 |
| 4,762,817 | 8/1988 | Logsdon et al. | 502/329 |
| 5,004,845 | 4/1991 | Bradley et al. | 568/885 |
| 5,506,363 | 4/1996 | Grate et al. | 568/401 |
| 5,557,014 | 9/1996 | Grate et al. | 568/401 |

FOREIGN PATENT DOCUMENTS

| | | |
|---|---|---|
| 828603 | 10/1975 | Belgium . |
| 0031729 | 7/1981 | European Pat. Off. . |
| 0064371 | 11/1982 | European Pat. Off. . |
| 0194541 | 9/1986 | European Pat. Off. . |
| 123085 | 11/1976 | German Dem. Rep. . |
| 61-043131 | 8/1984 | Japan . |
| 1376432 | 12/1974 | United Kingdom . |
| 1508331 | 4/1978 | United Kingdom . |

OTHER PUBLICATIONS

Tsigdinos et al., "Molybdovanadophosphoric Acids and Their Salts", *Inorganic Chemistry*, 7, 437–441 (Mar. 1968).
Kokorin, A.I., *Zh. Obshch. Khim.* 24:966 (1954). The English translation edition, "Heterotriacids. I. Phosphomolybdenovanadic and Phosphotungstenovanadic Acids", *J. Gen. Chem. USSR*, pp. 967–970, is provided.
Zangen, M., "Solvent Extraction From Molten Salts. V. Zinc(II) Chloride, Bromide, and Iodide", *Inorg. Chem.*, 7:133–138 (1968). p. 137 is provided.

Polotebnova, N.A., et al., *Zh. Neorg. Khim.* 19:413 (1973). The English translation edition, "Properties of Vanadomolybdophosphoric Acids with Varying Concentrations of Molybdenum and Vanadium", *Russian Journal of Inorganic Chemistry* 18:216–219 (1973), is provided.
Burov, Y.V., et al., *Izvestiya Akademii Nauk SSSR, Seriya Khimicheskaya* 7:1469–1473 (1980). The English translation edition, "Steady–Flow Investigation of the Kinetics of the Reaction Between $VO^{2+}$ and Phosphorus–Molybdenum– Vanadium Heteropoly Anions", pp. 1017–1021, is provided.
Smidt, J., et al., "The Oxidation of Olefins with Palladium Chloride Catalysts", *Angew. Chem. Internat. Edit.* (1962) vol. 1, pp. 80–88.
Miller, S.A., editor, *Ethylene and Its Industrial Derivatives* (published by Ernest Benn Ltd. London, 1969), Chapter 8, pp. 639–689.
Matveev, K.I., et al., *Kinetika i Kataliz* (1977) vol. 18, No. 2, pp. 380–386. The English translation edition, "Kinetics of Oxidation of Ethylene to Acetaldehyde by Phosphomolybdicvanadic Heteropolyacids in the Presence of a Pd(II) Aquo Complex", pp. 320–326, is provided.
Matveev, K.I., *Kinetika i Katal.* (1977) vol. 18, No. 4, pp. 862–877. The English translation edition, "Development of New Homogeneous Catalysts for the Oxidation of Ethylene to Acetaldehyde", pp. 716–727, is provided.
Cihova, M., et al., "Catalytic Oxidation of Octene–1 in the Presence of Palladium(II) Salts and Heteropolyacids", *Reaction Kinetics and Catalysis Letters*, (1981) 16:383–386.
Cihova, M., et al., "Oxidácia 1–okténu na 2–octanón v prietĉnom reaktore", *Ropa Uhlie* (1986) 28:297–302. An English language abstract (Chem. Abstr. 107(1):6740r) is attached.
El Ali, Bassam, et al., "Oxydation catalytique de l'octène–1 en présence de complexes de rhodium(III) ou de palladium(II) associés à des acides phosphomolybdovanadiques et au dioxygéne", *J. Organomet. Chem.* (1987) 327:C9–C14. The publication includes an English language abstract.

(List continued on next page.)

*Primary Examiner*—Douglas J. McGinty
*Attorney, Agent, or Firm*—John H. Grate

[57] ABSTRACT

The present invention provides a process for the preparation of acidic aqueous solutions consisting essentially of, phosphomolybdovanadate salts. Certain processes of the present invention dissolve in water an oxide, oxoacid, or mixtures thereof, and at least one oxoanion salt of phosphorus, molybdenum, and vanadium, wherein the sum of salt cationic charges does not exceed the sum of the phosphomolybdovanadate anionic charges in the solution. Other processes of the present invention dissolve in water a) an oxide, oxoacid, oxoanion salt, or mixtures thereof of phosphorus, molybdenum, and vanadium and b) a carbonate salt, bicarbonate salt, hydroxide salt or mixtures thereof, wherein the sum of salt cationic charges does not exceed the sum of the phosphomolybdovanadate anionic charges in the solution. The present invention also provides processes for the preparation of solid phosphomolybdovanadate salts by evaporating the so-produced aqueous solutions to recover essentially all the dissolved phosphomolybdovanadate salt in solid form.

24 Claims, No Drawings

OTHER PUBLICATIONS

Kuznetsova, L.I., et al., "Catalytic Oxidation of Vanadyl Salts by Oxygen in the Presence of Sodium Molybdate", *Reaction Kinetics and Catalysis Letters* (1975) 3(3):305–310.

Kuznetsova, L.I., et al., *Koordinatsionnaya Khimiya* (1977) vol. 3., No. 1, pp. 51–58. The English translation edition, "State of Phosphomolybdovanadium Heteropoly Blue Oxides in Aqueous Solution", pp. 39–44, is provided.

Berdinikov, V.M., et al., *Koordinatsionnaya Khimiya* (1979) vol. 5, No. 1, pp. 78–85. The English translation edition "Kinetics and Mechanism of the Oxidation of Reduced Molybdovanadophosphoric Heteropolyacids with Oxygen Hexavanadic Heteropoly Blues", pp. 60–66, is provided.

Kozhevnikov, I.V., *Izvestiva Akademii Nauk SSSR, Seriva Khimicheskava* (1981) No. 11., pp. 2428–2435. The English translation edition, "Mechanism of the Oxidation of 12–Molybovanadophosphate Blues by Oxygen in Aqueous Solution", pp. 2001–2007, is provided.

Kuznetsova, L.I., et al., "Mechanism of Oxidation of Molybdovanadophosphoric Heteropoly Blues by Molecular Oxygen, Trivanadium Heteropoly Blue", *Reaction Kinetics and Catalysis Letters* (1981) 17:401–406.

Davison, S.F., et al., "Phosphomolybdic Acid as a Reoxidant in the Palladium(II)–catalysed Oxidation of But–1 ene to Butan–2–one", *J. Chem. Soc. Dalton Trans.* (1984) pp. 1223–1228.

Davison, S.F., Ph.D. Dissertation, "Palladium and Heteropolyacid Catalyzed Oxidation of Butene to Butanone", University of Sheffield, 1981. The Summary, Table of Contents, pp. 63 and 77, are provided.

Smidt, J. et al., "New Process for Aceton and MEK", *Hydrocarbon Processing*, pp. 149–152 are provided.

Wacker, "Process Can Make Acetone, MEK", *C. and E. N.*, Jul. 8, 1963, pp. 50–51 are provided.

Smidt, J., et al., "New Production Process for Acetone and Methylethylketone", Sixth World Petroleum Congress Proceedings, Section IV–Paper 40, pp. 461–466 are provided.

Bonnier, J., et al., "Raney Nickel as a Selective Catalyst for Aldehyde Reduction in the Presence of Ketones", *Applied Catalysis*, 30:181–184 (1987).

Koscielski, T., et al., "Catalytic Hydrogenation on Raney Nickel Catalyst Modified by Chromium Hydroxide Deposition", *Applied Catalysis*, 49:91–99 (1989).

1

PREPARATION OF PHOSPHOMOLYBDOVANADATE POLYOXOANIONS

CROSS-REFERENCES TO RELATED APPLICATIONS

This application is a continuation, of application Ser. No. 07/675,937 filed Sep. 4, 1992, now abandoned, which is a continuation-in-part of U.S. patent application Ser. No. 489,806 filed Mar. 5, 1990, now abandoned, which is incorporated by reference entirely. Related U.S. patent applications Ser. Nos. 07/689,050, filed Sep. 4, 1992, 07/689,048 filed Sep. 4, 1992, and 07/934,643 filed Sep. 4, 1992, co-filed with Ser. No. 07/675,937 on Sep. 4, 1992, are each incorporated by reference entirely.

FIELD OF THE INVENTION

This invention relates generally to preparation of heteropolyoxoanions comprising phosphorus, molybdenum, and vanadium. More specifically, it relates to preparation of aqueous solutions of phosphomolybdovanadate salts. It further relates to preparation of solid phosphomolybdovanadate salts.

BACKGROUND OF THE INVENTION

Polyoxoacids and polyoxoanions are useful in a variety of catalytic reaction processes. Polyoxoacids and polyoxoanions comprising vanadium are particularly useful in catalytic oxidation processes. Among the polyoxoacids and polyoxoanions which have proven most useful in catalytic oxidations are the phosphomolybdovanadic acids and phosphomolybdovanadate anions. These materials are useful oxidizing agents whose reduced forms can be re-oxidized by reaction with dioxygen. Accordingly, they can mediate or catalyze the oxidation of reaction substrates by molecular oxygen. Oxidation processes have been described which use these materials dissolved in a solution, usually an aqueous solution, and as a solid, either bulk or supported on an inert support.

U.S. patent applications Ser. No. 489,806 filed Mar. 5, 1990, and Ser. Nos. 07/689,050, filed Sep. 4, 1992, 07/689, 048 filed Sep. 4, 1992, and 07/934,643 filed Sep. 4,1992, co-filed with Ser. No. 07/675,937 on Sep. 4, 1992, disclose the use of polyoxoanions comprising vanadium, and specifically phosphomolybdovanadates, in aqueous catalyst solutions and processes for the oxidation of olefins to carbonyl products. In certain of the inventive solutions and processes, the aqueous catalyst solutions are essentially free of sulfuric acid and sulfate ions. In other inventive solutions and processes, the solutions and related processes are essentially free of mineral acids and acid anions other than of the polyoxoacid.

Background methods for the preparation of phosphomolybdovanadate salts in aqueous solution free of other mineral acids and salts, from starting materials of the component elements, are wasteful, protracted, or inefficient. Background methods for the preparation of solid phosphomolybdovanadic acid and salts therefrom are likewise wasteful, protracted, or inefficient.

Zh. Obshch. Khim. 24 (1954), p. 966 (English translation edition p. 967) discloses the synthesis of a phosphomolybdenovanadic acid said to have the probable formula $H_7[P(Mo_2O_7)_5V_2O_6]$ from sodium vanadate, phosphoric acid, and molybdic acid, in which the phosphoric acid and molybdic acids were used in stoichiometric proportions, and the sodium vanadate was used in 2- and 3-fold excess. These starting materials were placed in water and the mixture was boiled to dissolve the molybdic acid. The cooled resulting solution was acidified with concentrated HCl up to 3.3 N (which corresponds to >25% by volume concentrated HCl added to the solution) and extracted with ether. The separated ether solution was washed with aqueous HCl, then water was added and the ether was removed to crystallize the product. The crystals were isolated by filtration. The yield was 80% of theoretical.

The method of Zh. Obshch. Khim. 24 (1954), p. 966 is wasteful in that the sodium vanadate is provided in 2- to 3-fold excess of the stoichiometric proportion and only 80% of the theoretical yield is obtained. Moreover, the method consumes large amounts of concentrated hydrochloric acid. It is also inconvenient in its use of ether extraction to separate the product from excess vanadate, hydrochloric acid, and other unextracted components in the aqueous solution.

Inorg. Chem., 7(1968), p. 437 discloses the method of Zh. Obshch. Khim. 24 (1954), p. 966 modified by the substitution of molybdenum trioxide for molybdic acid, $MoO_3 \cdot 2H_2O$. It also discloses a method for the preparation of the free molybdovanadophosphoric acids $H_4[PMo_{11}VO_{40}]$, $H_5[PMo_{10}V_2O_{40}]$, and $H_6[PMo_9V_3O_{40}]$ by acidification of aqueous solutions of $Na_2HPO_4$, sodium metavanadate, and $Na_2MoO_4 \cdot 2H_2O$ with concentrated sulfuric acid and, after cooling, extraction with ethyl ether. Vanadyl species are said to be probably retained in the water layer. The ether was evaporated, the resulting solid dissolved in water and the solution concentrated for crystallization and filtration of the product. The experimental descriptions reveal that for the preparations of $H_5[PMo_{10}V_2O_{40}]$ and $H_6[PMo_9V_3O_{40}]$, two-fold sodium metavanadate is added over the stoichiometric ratios of the product formulas. Moreover, no more than a 30% of the theoretical yield of the crystalline product was obtained in any of the described preparations. This reference also discloses a method for the preparation of $Na_4[PMo_{11}VO_{40}]$ by dissolving $H_4[PMo_{11}VO_{40}]$ in water and passing the solution through a column of ion-exchange resin in the sodium form.

Zh. Neorg. Khim., vol. 18 (1973), p. 413 (English translation edition pp. 216–219) discloses the preparation of vanadomolybdophosphoric acids by essentially the same method as Inorg. Chem., 7(1968), p.437. $Na_2HPO_4$, $Na_2MoO_4 \cdot 2H_2O$, and $NaVO_3 \cdot 2H_2O$ in water at "pH" 2 was boiled, cooled, and extracted with ether. The method of acidification of these basic salts in water to "pH" 2, when stated, is with sulfuric acid. Crystalline products were obtained in 18–27% yield and the experiments indicated that to obtain a heteropoly-complex containing three or four vanadium atoms, an excess of vanadate is required. To obtain the product with the composition ratio P:Mo:V= 1:8:4, the starting materials were taken in the ratio 1:8:12.

The methods of Inorg. Chem., 7(1968), p.437 and Zh. Neorg. Khim., vol. 18 (1973), p. 413 are wasteful in that the sodium vanadate is usually provided in excess of the stoichiometric proportion and the yields of product obtained from the starting materials are very poor. Moreover, the method consumes large amounts of sulfuric acid. It is also inconvenient in its use of ether extraction to separate the product from excess sulfuric acid and other unextracted components in the aqueous solution.

United Kingdom Patent No. 1,376,432 discloses a process for the preparation of 12-heteropolyphosphate having the general formula $Z_nH_m(PMo_aW_bV_cO_{40}) \cdot xH_2O$ where a+b+

$c=12$, $c \leq 6$, and Z is an alkali metal or ammonium ion. In the disclosed process, an alkali metal phosphate or orthophosphoric acid is reacted in aqueous medium with one or more metal compounds selected from molybdic oxide, molybdic acid, tungstic acid, tungstic oxide, vanadium pentoxide, and sodium metavanadate; an alkali hydroxide or ammonia are then added in order to obtain a substantially clear liquor; and a mineral acid, preferably hydrochloric acid, is then added to give a "pH" of less than 1. The products are then crystallized from the resulting aqueous medium. In the only exemplification for preparing a molybdovanadophosphate, a product said to be $Na_5H(PMo_gV_3O_{40}).6H_2O$ was prepared from orthophosphoric acid, sodium hydroxide, molybdic acid, and sodium metavanadate ($NaVO_3$) slurried in 500 ml water. The slurry was heated and additional sodium hydroxide was then added in order to convert the slurry to a clear solution. 250 ml of concentrated hydrochloric acid was then added, the volume of the liquor was reduced by evaporation, and the product was crystallized. The reported yield was 87%.

The method of United Kingdom Patent No. 1,376,432 is wasteful in that it consumes large amounts of concentrated hydrochloric acid after adding sodium hydroxide in order to convert the slurry to a clear solution, and in that it gives an incomplete yield of product from the starting materials. It is also inconvenient in its reliance on crystallization to separate the product from the hydrochloric acid and sodium chloride in the synthesis solution.

Belgian Patent No. 828,603 and corresponding United Kingdom Patent No. 1,508,331 (hereafter "Matveev patents") disclose a method of preparing an aqueous solution of a heteropolyacid or mixed iso-polyacid or a salt thereof, which polyacid contains both molybdenum and vanadium, by dissolving in water oxides, salts, and/or acids of the elements forming the polyacid and then adding to the solution an organic or mineral acid other than the polyoxoacid and which is free of halide ions. $H_2SO_4$, $HNO_3$, $H_3PO_4$, and $CH_3COOH$ are listed as suitable acids and the most preferable is said to be sulfuric acid.

Matveev patents disclose preparations of heteropolyacids of the formula $H_n[PMo_pV_qO_{40}]$, in which $n=3+q$, $p=12-q$, by dissolving in water $Na_3PO_4$ (or $Na_2HPO_4$, or $NaH_2PO_4$, or $H_3PO_4$, or $P_2O_5$), $MoO_3$ (or $Na_2MoO_4$, or $H_2MoO_4$), $V_2O_5$ (or $NaVO_3$), and $Na_2CO_3$ (or NaOH) to form a solution, and then adding the other acid. In the examples, the "pH" of the solution is said to be adjusted to "1.0" by adding sulfuric acid. Heteropolyacids in the series designated $H_4[PMo_{11}VO_{40}]$ to $H_{11}[PMo_4V_8O_{40}]$ are said to be obtained in the result solutions.

(We have discovered that such solutions prepared according to the methods disclosed in Matveev patents are not truly represented as solutions of free heteropolyacids, as indicated by the recited formulas of the type $H_n[PMo_pV_qO_{40}]$. Instead, they were determined to be solutions of sodium salts of partially or completely neutralized heteropolyacids—that is, solutions of sodium polyoxoanion salts—and contain high concentrations of sodium bisulfate and sulfate salts resulting from the addition of sulfuric acid to solution of basic salts.)

In certain examples in Matveev patents (Example 7) $NaH_2PO_4$, $H_2MoO_4$, $V_2O_5$, and $NaHCO_3$ are said to be reacted in ratios such that the g-atoms of sodium ions is less than the g-atoms of vanadium plus three times the g-atoms of phosphorus. Sulfuric acid is added to these reaction mixtures in order to adjust the "pH" to "1.0"

*Izvestiya Akademii Nauk SSSR, Seriya Khimicheskaya*, 1980, p. 1469 (English translation edition p. 1017) discloses that heteropolyanions were obtained "in the form of aqueous solutions by reacting stoichiometric amounts of $H_3PO_4$, $MoO_3$, and $NaVO_3.2H_2O$ with heating in the presence of $Na_2CO_3$". Neither the molar ratio of $Na_2CO_3$ to other starting materials, the absolute amount or concentration of any starting material, the concentration of the heteropolyanion in the resulting solution, the identity and concentration of any other components of the resulting solution, the hydrogen ion concentration, nor any pH measurement of the resulting solution is revealed. This reference does not reveal the composition of any product solution nor give any indication as to what product solutions may or may not be obtained by the mentioned process.

*Izvestiya Akademii Nauk SSSR, Seriya Khimicheskaya*, 1980, p. 1469 further discloses the addition of vanadium(IV) in the form of $VOSO_4.2H_2O$ to the aqueous solutions. Subsequently, solutions are mentioned which contain heteropolyanion at $5.10^{-3}$–$3.78.10^{-2}$M, $VO^{2+}$ at $4.8.10^{-4}$–$2.05.10^{-3}$M, and "pH" 1.60–2.98 in buffer solution of $NaHSO_4$ and $Na_2SO_4$. Neither the concentration of $NaHSO_4$ and $Na_2SO_4$ nor any accounting of their origin is revealed. Numerous other references by authors of *Izvestiya Akademii Nauk SSSR, Seriya Khimicheskaya*, 1980, p. 1469, including Matveev patents mentioned above, employ excess $Na_2CO_3$ and sulfuric acid in combination to prepare solutions of heteropolyacids or heteropolyanions.

U.S. Pat. No. 4,146,574 discloses a process for the preparation of free molybdovanadophosphoric acids by hydrothermally reacting an aqueous slurry which contains an oxide and/or oxyacid each of molybdenum, vanadium, and phosphorus, thereby forming an aqueous solution of a heteropolyphosphoric acid containing molybdenum and vanadium. The Examples describe only the preparation the $H_5PMo_{10}V_2O_{40}$ heteropolyacid from molybdenum trioxide, vanadium pentoxide, and phosphoric acid. In typical Examples (see Examples 1 and 2), vanadium pentoxide is typically provided in 20% excess over the stoichiometric proportions obtained in the $H_5PMo_{10}V_2O_{40}$ product and after 20 days of refluxing the slurry, 16–18% of the vanadium pentoxide is recovered as insoluble residue by filtration. Only using very dilute slurries (Example 9, ~0.03M phosphoric acid) was substantially more complete incorporation of the vanadium pentoxide into the product obtained so that the vanadium pentoxide could be introduced in near the stoichiometric proportion of the product.

The method of U.S. Pat. No. 4,146,574 is inefficient in that weeks of reflux are required to obtain the desired incorporation of vanadium pentoxide into the solution product, and even then, either the solution or the undissolved residue must be analyzed for mass and elemental composition in order to know the composition of the solution product. Alternatively, if more complete incorporation of the starting materials into the solution product is accomplished by using a dilute slurry, larger volume equipment is required to make the same amount of dissolved free heteropolyacid and then the resulting solution must be concentrated by evaporation.

OBJECTS OF THE INVENTION

The present invention is directed towards one or more of the following objects. It is not intended that every embodiment will provide every one of these recited objects. Other objects and advantages will become apparent from a careful reading of this specification.

An object of this invention is to provide an effective and efficient process for the preparation of a heteropolyoxoanions comprising phosphorus, molybdenum, and vanadium.

Another object of this invention is to provide an effective and efficient process for the preparation of aqueous solutions of phosphomolybdovanadate salts. Another object of this invention is to provide an effective and efficient process for the preparation of solid phosphomolybdovanadate salts.

A further object of this invention is to provide an effective and efficient process for the preparation of acidic aqueous solutions of phosphomolybdovanadic acid salts which are essentially free of acids and acid anions other than of phosphomolybdovanadic acids. A further object of this invention is to achieve the preceding objective without first preparing a free phosphomolybdovanadic acid. Another object of this invention is to provide an effective and efficient process for the preparation of aqueous solutions of phosphomolybdovanadate salts which are essentially free of salts other than of said phosphomolybdovanadate salts. Another object of this invention is to provide an effective and efficient process for the preparation of solid phosphomolybdovanadate salts by simple evaporation of aqueous solutions of phosphomolybdovanadate salts which are essentially free of salts other than of said phosphomolybdovanadate salts resulting from their preparation by the process of the present invention.

A further object of this invention is to achieve any of the above objectives with essentially complete incorporation of the provided starting materials into the phosphomolybdovanadate salt product. Another object of this invention is to achieve any of the above objectives so that the yield of the phosphomolybdovanadate salt product is essentially quantitative from the starting materials. Another object of this invention is to achieve any of the above objectives without providing any substantial excess of any starting material over the stoichiometric proportions in the phosphomolybdovanadate salt product. Another object of this invention is to achieve any of the above objectives so that the elemental composition of the phosphomolybdovanadate salt solution or solid is precisely set by the amounts of starting materials provided. Another object of this invention is to achieve any of the above objectives so that the elemental composition of the phosphomolybdovanadate salt solution or solid is precisely known by simple gravimetric and volumetric measurements of the starting materials or product or both, an not requiring any elemental analysis of the product or any by-products.

SUMMARY OF INVENTION

The present invention provides processes useful for the preparation of aqueous solutions of phosphomolybdovanadate salts essentially free of acids and salts other than of phosphomolybdovanadates. It also provides processes useful for the preparation of aqueous solutions consisting essentially of phosphomolybdovanadate salts. It also provides processes useful for the preparation of solid phosphomolybdovanadate salts.

In certain processes of the present invention, the aqueous solutions of phosphomolybdovanadate salts are prepared by dissolving in water oxides, oxoacids, oxoanion salts, or mixtures thereof, of phosphorus, molybdenum, and vanadium, and optionally a carbonate salt, bicarbonate salt, hydroxide salt, or oxide salt, such that the sum of the salt cationic charges in the solution does not exceed the sum of the phosphomolybdovanadate anionic charges. In other processes of the present invention, the sum of the salt cationic charges in the solution does not exceed the sum of the moles of vanadium plus three times the moles of phosphorus in the solution. In other processes of the present invention, the sum of the salt cationic charges in the solution does not exceed the sum of the moles of vanadium in the solution.

In certain processes of the present invention, the aqueous solutions of phosphomolybdovanadate salts are prepared by dissolving in water oxides, oxoacids, or mixtures thereof of molybdenum and phosphorus and a soluble oxoanion salt of vanadium. Optionally, a carbonate salt, bicarbonate salt, hydroxide salt, or oxide salt is also added provided the sum of the salt cationic charges in the solution does not exceed the sum of the phosphomolybdovanadate anionic charges.

In certain other processes of the present invention the aqueous solutions of phosphomolybdovanadate salts are prepared by dissolving in water oxides, oxoacids, oxoanion salts, or mixtures thereof, of phosphorus, molybdenum, and vanadium, and optionally a carbonate salt, bicarbonate salt, hydroxide salt, or oxide salt, such that the resulting ratio of hydrogen ions and salt countercations balancing the negative charge of the resulting polyoxoanions in the solution provides a hydrogen ion concentration greater than $10^{-5}$ moles/ liter. In other processes of the present invention, the resulting ratio of hydrogen ions and salt countercations balancing the negative charge of the resulting polyoxoanions in the solution provides a hydrogen ion concentration greater than $10^{-3}$ moles/liter. In still other processes of the present invention, the resulting ratio of hydrogen ions and salt countercations balancing the negative charge of the resulting polyoxoanions in the solution provides a hydrogen ion concentration greater than $10^{-1}$ moles/liter when essentially all of the vanadium is in the vanadium(V) state In other processes of the present invention, solid phosphomolybdovanadate salts are prepared by evaporation of aqueous solutions consisting essentially of phosphomolybdovanadate salts prepared by the aforementioned processes of the present invention.

DETAILED DESCRIPTION OF THE INVENTION

Phosphomolybdovanadate Acids and Salts

Phosphomolybdovanadate polyoxoanions which can be prepared by the present invention have the Keggin structure and are represented by the following general formula when in the oxidized state:

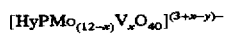

wherein:

x and y are integers;

$0<x<12$; and, $0\leq y \leq (3+x)$.

More specifically, $0\leq y<(3+x)$ for polyoxoanion species (phosphomolybdovanadate anions) and $0<y\leq(3+x)$ for polyoxoacid species (phosphomolybdovanadic acids). Except when a polyoxo species is completely deprotonated (i.e., y=0) or completely protonated (i.e., y=(3+x)), it is both a polyoxoanion species and a polyoxoacid species. However, protons dissociated into solution may also be considered in designating a solution as comprising a polyoxoacid, even though all the polyoxo species present may be fully deprotonated in the solution. The Keggin phosphomolybdovanadates have been found to be anions of very strong acids, and are believed never to be fully protonated in aqueous solution.

The net negative charge of the polyoxoanions is balanced by countercations which are protons and/or salt cations. When only protons are present as countercations (when y=(3+x) for the Keggin phosphomolybdovanadic acid), one has a "free acid" polyoxoacid (a free phosphomolybdovanadic acid). When one or more salt cations are present as countercations, in place of protons, one has a polyoxoanion salt, also called a salt of the polyoxoacid. When both protons and salt cations are present, one has a partial salt of the polyoxoacid; the free polyoxoacid is partially neutralized. The phosphomolybdovanadate salts of the present invention include both partial salts and full salts, having $0<y\leq(3+x)$ Suitable salt cations are those which are inert, or in some way advantageous for some purpose (for example, $Pd(H_2O)_4^{2+}$ in olefin oxidation reactions). Preferred salt countercations are alkali metal cations and alkaline earth cations which do not precipitate insoluble polyoxoanion salts; for example: lithium, sodium, potassium, beryllium, and magnesium cations, or mixtures thereof. Most preferred are lithium ($Li^+$), sodium ($Na^+$), and magnesium ($Mg^{2+}$) cations. Ammonium cations may also be used. Mixtures of salt countercations may be present.

The Keggin phosphomolybdovanadates exist in aqueous solution as equilibrium mixtures of anions varying in vanadium and molybdenum content (varying in x). Moreover, for each value x such that $1<x<11$, there are a number of positional isomers for the placement of the vanadium and molybdenum in the Keggin structure: for $x=2$ there are five isomers, for $x=3$ there are 13 isomers, for $x=4$ there are 27 isomers, and so on. Each of these compositional and isomeric species has its own acid dissociation constants which determine the extent to which it is protonated at a given hydrogen ion concentration is solution. (That is, each compositional and isomeric species can have its own average y value in a given solution.) Accordingly, the compositions of aqueous Keggin phosphomolybdovanadate solutions are not generally easily characterized in terms of a their component species $[H_yPMo_{(12-x)}V_xO_{40}]^{(3+x-y)-}$ and their individual concentrations.

The present inventors have adopted a simplified, yet definitive, method of designating the elemental constitution of solutions containing Keggin phosphomolybdovanadate free acids or alkali metal salts in the oxidized state, in terms of the general formula:

$$\{A_pH_{(3+n-p)}PMo_{(12-n)}V_nO_{40}\}$$

wherein:

A is an alkali metal cation ($Li^+$, $Na^+$);

the designated concentration of the solution is its phosphorus concentration, usually reported in moles/liter (molar, M);

phosphorus, molybdenum, and vanadium are present in the concentration ratios defined by n, and $0<n<12$;

alkali metal is present in solution in a concentration ratio to phosphorus defined by p, and $0<p\leq(3+n)$.

Accordingly, the negative charge of the designated Keggin formula in fully deprotonated form, 3+n, is balanced in solution by p+q monocations. Since this designation refers to a mixture of polyoxoanions, n and p may be non-integral.

This designation completely defines the elemental constitution of an aqueous solution. A given elemental constitution will have one thermodynamic equilibrium distribution of species comprising its component elements. When the phosphorus, molybdenum, and vanadium in these solutions are predominantly present in Keggin heteropolyanions of formula $[H_yPMo_{(12-x)}V_xO_{40}]^{(3+x-y)-}$ (which is usually the case in the preferred solutions of the present invention), then n is approximately equal to the average value of x among the distribution of species. The concentration of free hydrogen ions in such a solution is approximately the concentration of phosphorus multiplied by the difference between p and the average value of y among the distribution of species. When the phosphomolybdovanadates are the only acids in solution, the acidity of the solution can be set by the phosphomolybdovanadate concentration, its identity (n), and the ratio of alkali cations (p) to hydrogen ions (3+n–p).

Preferred phosphomolybdovanadate solutions following this method of designation have $0<n<12$. Especially preferred solutions have $2<n<6$.

The concentration of the polyoxoanion can be varied over a broad range, typically within 0.001 to 1.0 moles/liter. Preferred concentrations depend strongly on the intended use of the solution. Typically, preferred polyoxoanion concentrations are 0.1 to 1.0 molar.

Process for the Preparation of Phosphomolybdovanadate Salt Solutions

According to the present invention, acidic aqueous solutions consisting essentially of phosphomolybdovanadate salts of are prepared by dissolving in water oxides, oxoacids, and/or salts of oxoanions of the phosphorus, molybdenum, and vanadium, and optionally carbonate salts, bicarbonate salts, hydroxide salts, or mixtures thereof. In the context of the present invention, solutions consisting essentially of phosphomolybdovanadate salts are essentially free of salts other than of phosphomolybdovanadate salts and acids other than of phosphomolybdovanadic acids. In this context, however, excess phosphoric acid in solution is not excluded; it is considered "of phosphomolybdovanadic acids". In the context of the present invention, dissolving in water means adding the reactants to water under conditions sufficient for their hydrothermal reaction to form soluble phosphomolybdovanadate salts.

Preferably the vanadium, molybdenum, and phosphorus reactants are added in ratios corresponding to the average phosphomolybdovanadate salt composition in the intended solution. According to this preference, the mole sum of the vanadium and molybdenum should be about twelve times the phosphorus concentration, although the invention broadly encompasses other ratios.

The ratio of vanadium to phosphorus is preferably not greater than 6, more preferably not greater than 5, still more preferably not greater than 4, and most preferably less than 4. The invention is particularly effective for the preparation of phosphomolybdovanadate salt solutions having vanadium to phosphorus ratios of 1 to 3.

The ratio of salt cations to the resulting phosphomolybdovanadate anion is limited so that the sum of the salt cationic charges in the solution does not exceed the sum of the phosphomolybdovanadate anionic charges. That is, the total amount of salts provided is such that after the phosphomolybdovanadate salts are formed, there are no remaining salts in the solution other than the phosphomolybdovanadate salts. Said another way, the sum of the salt countercation charges added in the solution is not to exceed the sum of the g-atoms vanadium plus three times the g-atoms phosphorus in the solution.

Preferably, the ratio of salt cation charges to the phosphomolybdovanadate anionic charges (which is p/(3+n) in the above formula for alkali cations and single charged cations in general), is less than 1. More preferably, the average phosphomolybdovanadate anionic charge, if fully deprotonated (3+n in the above formula) is balanced in solution by at least one proton, which may or may not be bound by the phosphomolybdovanadate anion. This gives a ratio of salt cation charges to the phosphomolybdovanadate anionic charges of no greater than (2+n)/(3+n), where n is the average vanadium content of the phosphomolybdovanadate anions in solution. Most preferably, the sum of the salt countercation charges added in the solution does not exceed the g-atoms vanadium in the solution.

Phosphomolybdovanadate salts are preferably prepared in solution by dissolving in water vanadium oxide and/or a vanadate salt, molybdenum oxide and/or a molybdate salt, phosphoric acid and/or a phosphate salt, and optionally a carbonate salt, a bicarbonate salt, and/or a hydroxide salt, such that the ratio of protons (3+n–p) and other salt countercations (p) balancing the negative charge of the phosphomolybdovanadates (3+n) in the solution provides the desired hydrogen ion concentration in the solution. Generally, the resulting ratio of protons and salt countercations balancing the net negative charge of the resulting polyoxoanions in the solution provides a hydrogen ion concentration in solution greater than $10^{-5}$ moles/liter. Preferably, the resulting hydrogen ion concentration is greater than $10^{-4}$ moles/liter, more preferably greater than $10^{-3}$ moles/liter, still more preferably greater than $10^{-2}$ moles/liter, and most preferably greater than 0.1 moles/liter.

The temperature of the preparation process may be within the range 50 to 120° C. It is most conveniently operated in boiling water at about 100° C. There is no particular upper or lower pressure for operating the process. The process is most readily conducted at least at 1 atmosphere pressure or at the vapor pressure of water at the reaction temperature, whichever is greatest. When carbonate or bicarbonate salts are added in the preparation, the resulting pressure of carbon dioxide should be vented.

Specific examples of suitable oxides, oxoacids, and oxoanion salts to be used as raw materials include molybdenum trioxide, molybdic acid, and alkali molybdates, vanadium pentoxide, alkali decavanadate, alkali metavanadate, and alkali orthovanadate, phosphoric acid, phosphoric anhydride, and alkali phosphates. Ammonium salts may also be used in place of alkali salts. Molybdenum trioxide, phosphoric acid, alkali metavanadate, and alkali decavanadate are preferred. Specific examples of carbonate, bicarbonate, and hydroxide salts are the alkali carbonates, bicarbonates, and hydroxides, all of which are essentially functionally equivalent in the process. Again, ammonium salts may also be used in place of alkali salts.

Typically, a solution of an alkali vanadate, for example sodium metavanadate ($NaVO_3$) or hexasodium decavanadate ($Na_6V_{10}O_{28}$), is prepared in water. This solution can be prepared by dissolving these solid salts into water, but is prepared most economically by adding at least a stoichiometric amount of alkali carbonate (e.g. $Na_2CO_3$), alkali bicarbonate (e.g. $NaHCO_3$), or alkali hydroxide (e.g. $NaOH$) to a suspension of vanadium oxide ($V_2O_5$) in water and heating to complete the reactive dissolution. Then, molybdenum oxide and phosphoric acid (or alkali phosphate salt) are added to the alkali vanadate solution and heating is continued to complete the preparation of an acidic aqueous phosphomolybdovanadate salt solution. Finally, the solution is adjusted to the desired concentration by evaporation and/or volumetric dilution.

Additional basic alkali salt (carbonate, bicarbonate, of hydroxide) can be added at any point during or after the preparation to further neutralize the resulting polyoxoacid solution and obtain decreased acidity; that is, to adjust the value p in the designation $\{A_pH_{(3+n-p)}PMo_{(12-n)}V_nO_{40}\}$. However, the total amount of alkali cations introduced in the preparation should not exceed the level needed to obtain p; that is less than (3+n).

One or more starting materials may contain a fraction of the metal element in a reduced state. For example, vanadium pentoxide often contains a percent or so of vanadium(IV). When it is desired that the product is essentially completely in the oxidized state, it is convenient to add a effective amount of hydrogen peroxide in the process. Excess hydrogen peroxide in the solution is decomposed by the solution when heated.

Hydrogen Ions

Hydrogen ions and hydrogen ion concentrations, as used herein, have their usual meaning. Hydrogen ions in aqueous solution are free, aquated protons. Hydrogen ion concentration is not meant to include protons bound in other solute species, such as in partially protonated polyoxoanions. In the solutions prepared by the inventive process, free of acids other than of phosphomolybdovanadate partial salts, hydrogen ions are present in solution by their dissociation from the phosphomolybdovanadate.

Hydrogen ion concentrations of phosphomolybdovanadate solutions, as recited herein, refer to the hydrogen ion concentration when essentially all the polyoxoanion is in its fully oxidized state, which is when essentially all the vanadium in the polyoxoanion solution is in the vanadium(V) state. It has been determined that the acidity of the preferred polyoxoanion solutions change with reduction, and these changes are not yet completely understood and predictable. (For example, 0.30M $\{Na_3H_3PMo_9V_3O_{40}\}$ solution has a hydrogen ion concentration greater than 0.10 moles/liter in equilibrated fully oxidized state, but less than 0.01 moles/liter in equilibrated fully reduced state, when all the vanadium is in the vanadium(V) state.) The preferred polyoxoanions of the present invention are most readily prepared essentially fully oxidized, and can be readily returned to that condition by reaction with dioxygen according to processes of the present invention. In the context of determining hydrogen ion concentrations, the phrase "when essentially all the oxidant is in its oxidized state" means when the solution of oxidant is sufficiently oxidized so as to have the hydrogen ion concentration which is obtained when it is fully oxidized.

The hydrogen ion concentration is sufficient to provide an acidic solution having a hydrogen ion concentration greater than $10^{-5}$ mole/liter. Preferably, the hydrogen ion concentration is greater than $10^{-3}$ moles/liter, and most preferably, greater than 0.1 moles/liter.

Hydrogen Ion Concentration Measurement

Background references for polyoxoanion solutions generally recite "pH" values for the solution but do not specify methods for determining them. pH is technically defined as $-\log [a_{H^+}]$, where $a_{H^+}$ is the hydrogen ion activity. The hydrogen ion activity is identical to the hydrogen ion concentration in otherwise pure water. The hydrogen ion activity and hydrogen ion concentration are still good approximations of each other in aqueous solutions which are low in ionic strength and otherwise approximately ideal. Solutions of polyoxoacids at decimolar concentrations, typical in background references and in the present invention, have high ionic strength and are very non-ideal solutions, especially when they also contain high concentrations of other mineral acid salts.

The common method to obtain pH measurements of aqueous solutions uses pH-sensitive glass electrodes, monitored with an electrometer (a "pH meter"). Such electrodes are known to exhibit an "acid error", measuring increasingly incorrect "pH"s as pH is decreased below 2 and especially at real pH 1 and below. Moreover, successful measurement at any pH level requires calibration with solutions of similar ionic media and ionic strength. Common calibration solutions for pH meters are at relatively low ionic strength and of very different ionic media compared to decimolar polyoxoanion salt solutions. We have found that using different common calibration solutions can lead to different "pH" measurements for the same polyoxoanion solution. Unless a disclosure contains a recitation of the method of "pH" measurement for these solutions, including the methods of calibration, one having ordinary skill does not know what a reported "pH" value really means, nor how to reproduce it.

We have developed a more definitive method of measuring hydrogen ion concentration in the polyoxoanion solutions of the present invention. It is based on the observation (by $^{31}$P- and $^{51}$V-NMR studies) that in solutions designated $\{A_pH_{(4-p)}PMo_{11}VO_{40}\}$, $PMo_{11}VO_{40}^{4-}$ is essentially the only species present. It was further determined that $PMo_{11}VO_{40}^{4-}$ remains completely unprotonated even in concentrated solutions (>0.3M) of the free acid $\{H_4PMo_{11}VO_{40}\}$. (Species having two or more vanadia do become protonated in acidic aqueous solutions.) Accordingly, for solutions of $\{A_pH_{(4-p)}PMo_{11}VO_{40}\}$, the hydrogen ion concentration is the phosphorus concentration multiplied by (4–p). Such solutions were prepared and used to calibrate glass pH electrodes for measurement of the hydrogen ion concentration of solutions of undetermined acidity, having the same phosphorus concentration. This method is illustrated in U.S. patent application Ser. No. 07/689,050, filed Sep. 4, 1992, incorporated by reference.

Solid Phosphomolybdovanadate Salts

Solid phosphomolybdovanadate salts which can be prepared by the present invention have the Keggin structure and are represented by the following general formula when in the oxidized state:

$$Z_pH_{(3+n-p)}PMo_{(12-n)}V_nO_{40} \cdot mH_2O$$

wherein:

Z is a salt cation having positive charge z, preferably an alkali cation;

0<n<12;

0<p≦(3+n)/z; and m≧0.

Process for the Preparation of Solid Phosphomolybdovanadate Salts

In the inventive processes for the preparation of solid phosphomolybdovanadate salts, an aqueous solution of phosphomolybdovanadate salts is first prepared according to the methods described herein, and it is evaporated to recover the solid phosphomolybdovanadate salts entirely. Since the aqueous solution is essentially free of acids and salts other than of said phosphomolybdovanadate, the dissolved phosphomolybdovanadate salt can be recovered quantitatively as a solid from the solution by evaporation. There is no need to provide for separation from other dissolved acids or salts, as in the extraction and crystallization/filtration processes of the background references.

Evaporation of the aqueous solution may be accomplished at room temperature and pressure, but is preferably accelerated by heating or removal of water vapor at reduced pressure or both. Preferred methods of evaporation include rotary thin film evaporation, spray drying, and the like. The aqueous solution may also be frozen and lyophilized to recover the product.

The first obtained solid salt is typically highly hydrous, often with m greater than about 20. Drying under dynamic vacuum, over a dessicant, or in a flow of dry gas at room temperature can reduce the water content of the solid to <20. If desired, the solid can be heated under dynamic vacuum or in a flow of dry gas to remove essentially all of the waters of hydration.

EXAMPLES

Without further elaboration, it is believed that one skilled in the art can, using the preceding description, utilize the present invention to its fullest extent. The following specific examples are, therefore, intended to be merely illustrative, and not limitative of the disclosure in any way whatsoever. Further exemplification is provided in patent application Ser. Nos. 07/689,050, 07/689,048, and 07/934,643, all filed Sep. 4, 1992, each of which is incorporated by reference entirely.

Every –log [H$^+$] value recited in these examples is the base 10 logarithm of the hydrogen ion concentration in units of mole/liter. Thus, –log [H$^+$]=1.0 corresponds to a hydrogen ion concentration of 0.10 mole/liter, and a –log [H$^+$]<1.0 corresponds to a hydrogen ion concentration greater than 0.10 mole/liter. –log [H$^+$] values recited herein were measured by the procedure exemplified in U.S. patent application Ser. No. 07/689,050, filed Sep. 4, 1992.

Example 1

Preparation of 0.30M $\{Na_4PMo_{11}VO_{40}\}$

An aqueous solution of the phosphomolybdovanadate full salt $Na_4PMo_{11}VO_{40}$ was prepared according to the following reaction equations:

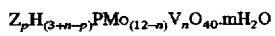

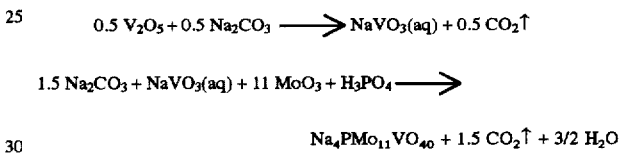

109.13 grams granular $V_2O_5$ (0.60 mole) was suspended in 1.0 liter distilled water in a Morton flask with overhead stirring. The mixture was heated to ca. 60° C. and 63.59 grams, granular $Na_2CO_3$ (0.60 mole) was slowly added in portions to the rapidly stirred suspension, causing $CO_2$ liberation and dissolution of the $V_2O_5$ to give an essentially homogeneous solution. The solution was heated at reflux for 60 minutes. Approximately 1 ml of 30% $H_2O_2$ was added dropwise to the mixture, which was maintained at reflux for an additional 60 minutes, then cooled to room temperature. The solution was clarified by vacuum filtration, and the resulting clear, orange sodium vanadate solution was then returned to a Morton flask with additional distilled water. 1900.01 grams $MoO_3$ (13.2 mole) was added with rapid stirring, the mixture was heated to about 60° C., and 190.78 grams granular $Na_2CO_3$ (1.80 mole) was slowly added in portions to the rapidly stirred suspension, causing $CO_2$ liberation and dissolution of $MoO_3$. 137.70 grams 85.4% (w/w) $H_3PO_4$ (1.20 mole) was then slowly added to the mixture, and the mixture was heated at the reflux and thereby converted to a clear, dark, burgundy-brown solution. After 3 hours at reflux, the homogenous solution was cooled to room temperature and volumetrically diluted with distilled water to a total volume of 4.0 liters, giving 0.30 molar $\{Na_4PMo_{11}VO_{40}\}$.

Example 2

Preparation of 0.30M $\{Li_4PMo_{11}VO_{40}\}$

The procedure was the same as for $\{Na_4PMo_{11}VO_{40}\}$ in Example 1 except that 133.00 grams granular $Li_2CO_3$ (1.80 mole) was substituted for the $Na_2CO_3$.

These solutions of 0.30M $\{A_4PMo_{11}VO_{40}\}$, A=Na, Li, were found to be reproducibly slightly acidic, having hydrogen ion concentrations ~0.001M. Presumably, a minute fraction of the Keggin polyoxoanion is hydrolytically dissociated, with release of hydrogen ions from water, at equilibrium. 162 MHz $^{31}$P-NMR and 105 MHz $^{51}$V-NMR spectra of these solutions were essentially identical to those of 0.30M $\{H_4PMo_{11}VO_{40}\}$, showing substantially only the $PMo_{11}VO_{40}^{4-}$ ion.

Example 3

Preparation of 0.30M $\{Na_2H_3PMo_{10}V_2O_{40}\}$

An aqueous phosphomolybdovanadic acid partial salt solution designated 0.30M $\{Na_2H_3PMo_{10}V_2O_{40}\}$ was prepared according to the following reaction equations:

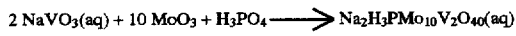

218.26 grams granular $V_2O_5$ (1.20 mole) was suspended in 2.0 liters distilled water in a Morton flask with overhead stirring and the mixture was heated to about 60° C. 127.19 grams granular $Na_2CO_3$ (1.20 mole) was slowly added in portion to the rapidly stirred mixture, causing $CO_2$ liberation and dissolution of the $V_2O_5$ to give an essentially homogeneous solution. The solution was heated at the reflux for 60 minutes. The solution was then a lime green color due to dissolved $V^{IV}$ which was originally present in the $V_2O_5$. Approximately 1 ml of 30% $H_2O_2$ was added dropwise to the mixture causing the dark, black-blue green color to fade, leaving a slightly turbid, pale-tan sodium vanadate solution. The solution was maintained at reflux for an additional 60 minutes to ensure the decomposition of excess peroxide and then cooled to room temperature. The solution was clarified by vacuum filtration to remove the small amount (<0.1 grams) of brown solid which contained almost all the iron and silica impurities originally present in the $V_2O_5$. The clear, orange sodium vanadate solution was then returned to a Morton flask, and 1727.28 grams $MoO_3$ (12.00 mole) was added with rapid overhead stirring. The mixture was heated to about 60° C. and 137.7 grams 85.4% (w/w) $H_3PO_4$ (1.20 mole) was added. The mixture was heated at the reflux and thereby converted to a clear, dark, burgundy-red solution. After 3 hours at reflux, the homogenous burgundy-red solution was cooled to room temperature and volumetrically diluted with distilled water to a total volume of 4.00 liters, giving 0.30M $\{Na_2H_3PMo_{10}V_2O_{40}\}$.

The hydrogen ion concentration of 0.30M $\{Na_2H_3PMo_{10}V_2O_{40}\}$ was measured to be 0.67 mole/liter; $-\log [H^+]=0.18$.

Example 4

Preparation of 0.30M $\{Na_5PMo_{10}V_2O_{40}\}$

An aqueous phosphomolybdovanadate full salt solution designated 0.30M $\{Na_5PMo_{10}V_2O_{40}\}$ was prepared according to the following reaction equations:

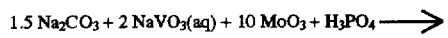

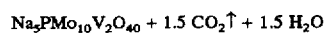

The procedure was the same as in Example 3 except that after the addition of the $MoO_3$, the mixture was heated to the reflux and an additional 190.78 grams granular $Na_2CO_3$ (1.80 mole) was slowly added in portions to the stirred suspension, causing $CO_2$ liberation, before the addition of the $H_3PO_4$.

Example 5

Preparation of 0.30M $\{Li_2H_3PMo_{10}V_2O_{40}\}$

The procedure was the same as for 0.30M $\{Na_2H_3PMo_{10}V_2O_{40}\}$ in Example 3 except that granular $Li_2CO_3$ was substituted for the $Na_2CO_3$ and the preparation was scaled to give 10.0 liter product solution.

545.64 grams granular $V_2O_5$ (3.00 mole) was suspended in 2.0 liters distilled water in a Morton flask with overhead stirring and the mixture was heated to about 60° C. 221.67 grams granular $Li_2CO_3$ (3.00 mole) was slowly added in portions to the rapidly stirred mixture, causing $CO_2$ liberation and dissolution of the $V_2O_5$ to give and essentially homogeneous solution. The solution was heated at the reflux for 60 minutes. The solution was then dark green due to dissolved $V^{IV}$ which was originally present in the $V_2O_5$. Approximately 1 ml of 30% $H_2O_2$ was added dropwise to the mixture causing the dark, black-blue green color to fade, leaving a slightly turbid, pale-tan sodium vanadate solution. The solution was maintained at reflux for an additional 60 minutes to ensure the decomposition of excess peroxide and then cooled to room temperature. The solution was clarified by vacuum filtration to remove the small amount (~0.1 grams) of brown solid which contained almost all the iron and silica impurities originally present in the $V_2O_5$. The clear, orange sodium vanadate solution was then returned to a Morton flask, and 4318.20 grams $MoO_3$ (30.00 mole) was added with rapid overhead stirring. The mixture was heated to about 60° C. and 344.24 grams 85.4% (w/w) $H_3PO_4$ (3.00 mole) was added. The mixture was heated at the reflux and thereby converted to a clear, dark, burgundy-red solution. After 3 hours at reflux, the homogenous burgundy-red solution was cooled to room temperature and volumetrically diluted with distilled water to a total volume of 10.00 liters, giving 0.30M $\{Na_2H_3PMo_{10}V_2O_{40}\}$, having $-\log [H^+]= 0.10$.

Example 6

Preparation of 0.30M $\{Li_4HPMo_{10}V_2O_{40}\}$

An aqueous phosphomolybdovanadate partial salt solution designated 0.30M $\{Li_4HPMo_{10}V_2O_{40}\}$ was prepared according to the following reaction equations:

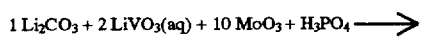

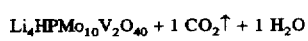

The procedure was the same as in Example 5 except that after the addition of the $MoO_3$, the mixture was heated to the reflux and an additional 221.67 grams granular $Li_2CO_3$ (3.00 mole) was slowly added in portions to the stirred suspension, causing $CO_2$ liberation, before the addition of the $H_3PO_4$. The hydrogen ion concentration was of 0.30M $\{Li_4HPMo_{10}V_2O_{40}\}$ measured to be $-\log [H^+]=0.63$

Example 7

Preparation of 0.30M $\{Na_3H_3PMo_9V_3O_{40}\}$

The phosphomolybdovanadic partial salt solution designated $\{Na_3H_3PMo_9V_3O_{40}\}$ was prepared according to the following reaction equations:

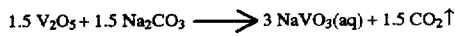

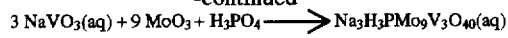

818.46 grams granular $V_2O_5$ (4.50 moles) was suspended in 3.5 liters distilled water in a Morton flask with overhead stirring and the mixture was heated to about 60° C. 476.95 grams granular $Na_2CO_3$ (4.50 moles) was slowly added in portions to the rapidly stirred mixture, causing $CO_2$ liberation and dissolution of the $V_2O_5$ to give and essentially homogeneous solution. The solution was heated at the reflux for 60 minutes. The solution was then dark, blue-green due to dissolved $V^{IV}$ which was originally present in the $V_2O_5$. Approximately 1 ml of 30% $H_2O_2$ was added dropwise to the mixture causing the dark, black-blue green color to fade, leaving a slightly turbid, pale-tan sodium vanadate solution. The solution was maintained at reflux for an additional 60 minutes to ensure the decomposition of excess peroxide and then cooled to room temperature. The solution was clarified by vacuum filtration to remove the small amount (<0.2 grams) of brown solid which contained almost all the iron and silica impurities originally present in the $V_2O_5$. The clear, orange sodium vanadate solution was then returned to a Morton flask, diluted with 4.0 liters distilled water, and 3886.38 grams $MoO_3$ (27.00 moles) was added with rapid overhead stirring. The mixture was heated to about 60° C. and 344.25 grams 85.4% (w/w) $H_3PO_4$ (3.00 moles) was added. The mixture was heated at the reflux and thereby converted to a clear, dark, burgundy-red solution. After 3 hours at reflux, the homogenous solution was cooled to room to room temperature and volumetrically diluted with distilled water to a total volume of 10.00 liters, giving 0.30M $\{Na_3H_3PMo_9V_3O_{40}\}$. The hydrogen ion concentration of 0.30M $\{Na_3H_3PMo_9V_3O_{40}\}$ was measured to be 0.35 mole/liter; $-\log [H^+]=0.45$ Example 8

Preparation of 0.30M $\{Li_3H_3PMo_9V_3O_{40}\}$

The procedure was the same as for 0.30M $\{Na_3H_3PMo_9V_3O_{40}\}$ in Example 7 except that 332.51 grams granular $Li_2CO_3$ (4.50 moles) was substituted for the $Na_2CO_3$. The hydrogen ion concentration of the solution was measured as $-\log [H^+]=0.38$ Example 9

Preparations of 0.30M $\{Na_3H_3PMo_9V_3O_{40}\}$ solutions from solid $NaVO_3$

Solutions of 0.30M $\{Na_3H_3PMo_9V_3O_{40}\}$ were prepared according to the second reaction equation under Example 7, starting with solid sodium metavanadate, as follows.

219.5 grams $NaVO_3$ (1.80 moles) was pulverized and added to 0.40 liters distilled water in an Erlenmeyer flask and the mixture was stirred and heated until all the $NaVO_3$ dissolved. The solution was then cooled to room temperature and clarified by vacuum filtration using distilled water rinses to ensure quantitative recovery of the dissolved sodium vanadate in the filtrate. The pale green-yellow solution was transferred to a Morton flask with distilled water added to a total volume of about 2.0 liters. 777.38 grams $MoO_3$ (5.40 moles) was added with rapid overhead stirring. The mixture was heated to about 60° C. and 68.855 grams 85.4% (w/w) $H_3PO_4$ (0.60 moles) was added. The mixture was heated at the reflux and thereby converted to a clear, dark, burgundy-red solution. After about 3 hours at reflux, the homogenous solution was cooled to room temperature and its volume was volumetrically adjusted to 2.00 liters, giving 0.30M $\{Na_3H_3PMo_9V_3O_{40}\}$.

Example 10

Preparation of 0.30M $\{Li_4H_3PMo_8V_4O_{40}\}$

The polyoxoacid partial salt solution 0.30M $\{Li_4H_3PMo_8V_4O_{40}\}$ was prepared analogously to 0.30M $\{Li_3H_3PMo_9V_3O_{40}\}$ (Example 8) and 0.30M $\{Li_2H_3PMo_{10}V_2O_{40}\}$ (Example 5), according to the following reaction equations:

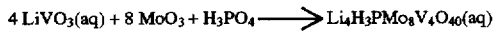

1091.28 grams granular $V_2O_5$ (6.00 mole) was suspended in 2.0 liters distilled water in a Morton flask with overhead stirring and the mixture was heated to about 60° C. 443.34 grams $Li_2CO_3$ chips (6.00 mole) was slowly added in portions to the rapidly stirred mixture, causing $CO_2$ liberation and dissolution of the $V_2O_5$ to give and essentially homogeneous solution. The solution was heated at the reflux for 60 minutes. The solution was then dark green due to dissolved $V^{IV}$ which was originally present in the $V_2O_5$. Approximately 1 ml of 30% $H_2O_2$ was added dropwise to the mixture causing the dark, black-blue green color to fade, leaving a slightly turbid lithium vanadate solution. The solution was maintained at reflux for an additional 60 minutes to ensure the decomposition of excess peroxide and then cooled to room temperature. The solution was clarified by vacuum filtration to remove the small amount (~0.1 grams) of brown solid which contained almost all the iron and silica impurities originally present in the $V_2O_5$. The clear, orange lithium vanadate solution was then returned to a Morton flask, and 3454.56 grams $MoO_3$ (24.00 mole) was added with rapid overhead stirring. The mixture was heated to about 60° C. and 344.24 grams 85.4% (w/w) $H_3PO_4$ (3.00 mole) was added. The mixture was heated at the reflux and thereby converted to a clear, dark, burgundy-red solution. After 3 hours at reflux, the homogenous burgundy-red solution was cooled to room temperature and volumetrically diluted with distilled water to a total volume of 10.00 liters, giving 0.30M $\{Li_4H_3PMo_8V_4O_{40}\}$, having $-\log [H^+]=0.88$ Example 11

Preparation of 0.30M $\{Li_7PMo_8V_4O_{40}\}$

The polyoxoanion full salt solution 0.30M $\{Li_7PMo_8V_4O_{40}\}$ was prepared analogously to 0.30M $\{Li_4PMo_{11}VO_{40}\}$ (Example 2), according to the following reaction equations:

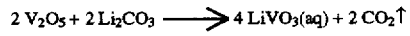

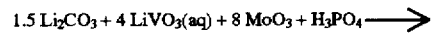

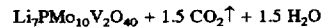

The procedure was the same as in Example 10 with the exceptions that the preparation was scaled to give 4.0 liter product solution (1.2 mole dissolved polyoxoanion salt) and after the addition of the $MoO_3$, the mixture was heated to the reflux and an additional 133.00 grams $Li_2CO_3$ chips (1.80 mole) was slowly added in portions to the stirred suspension, before the addition of the $H_3PO_4$.

Example 12 (Comparative)

Preparation of 0.317M $\{H_{4.9}PMo_{10.1}O_{40}\}$

Preparation of a desired phosphomolybdic free acid solution 0.30M $\{H_5PMo_{10}V_2O_{40}\}$ by the following reaction equation was attempted by adapting the procedures exemplified in U.S. Pat. No. 4,156,574:

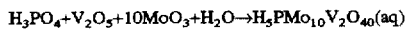

545.64 grams granular $V_2O_5$ (3.00 mole) and 4318.20 grams $MoO_3$ (30.00 mole) were suspended in 4.0 liters distilled water with moderate stirring. 344.23 grams 85.4% (w/w) $H_3PO_4$ (3.00 mole) was added, the mixture was diluted to a total volume of 10.0 liters with an additional 4.7 liters of distilled water, and the stirring mixture was heated to reflux. The mixture was maintained at reflux for 7 days, after which it was cooled to room temperature, the stirring was stopped, and the undissolved solids were allowed to fall for five days. The burgundy-red supernatant solution was decanted from yellow residue. Repeatedly, the residue was suspended in water, the suspension was centrifuged, and the supernatant was decanted. These wash supernatants were combined with the original supernatant and the resulting solution was clarified by vacuum filtration. The volume of the solution was reduced to about 9 liters by rotating-film evaporation at 50° C. under vacuum.

The yellow residue was dried over $CaCl_2$ dessicant under vacuum. The dry mass was 39.46 grams and was analyzed to be essentially completely $V_2O_5$ by quantitative elemental analyses for P, Mo, and V. The vanadium content of the polyoxoacid solution was determined by difference. The solution was volumetrically diluted with distilled water to a total volume of 9.379 liters to provide the desired vanadium concentration of 0.600 gram-atoms per liter. Accordingly, the composition of this solution is designated 0.317M $\{H_{4.9}PMo_{10.1}V_{1.9}O_{40}\}$+0.003M $H_3PO_4$. Alternatively, the solution may be viewed as 0.285M $H_5PMo_{10}V_2O_{40}$+ 0.032M $H_4PMo_{11}VO_{40}$+0.003M $H_3PO_4$.

This example shows that the process exemplified in U.S. Pat. 4,156,574 for the preparation of the free phosphomolybdovanadic acid $H_5PMo_{10}V_2O_{40}$ leaves a substantial fraction of the $V_2O_5$ starting material as an unreacted residue even after protracted refluxing so that the composition of the product cannot be set by the amount of $V_2O_5$ provided and can only be known except by careful analyses after the preparation. Compare Example 3 wherein the conversion of $V_2O_5$ to soluble $NaVO_3$ provides for its complete incorporation into the partial salt solution of $\{Na_2H_3PMo_{10}V_2O_{40}\}$ whose composition is precisely known from the quantities of starting materials used.

Example 13 (Comparative)
Preparation of 0.280M $\{H_{5.4}PMo_{9.6}V_{2.4\ O40}\}$ Preparation of 9.6 liters of a desired phosphomolybdovanadic free acid solution 0.30M $\{H_6PMo_9V_3O_{40}\}$ by the following reaction equation was attempted by adapting the procedures exemplified in U.S. Pat. No. 4,146,574:

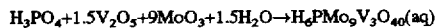

785.8 grams granular $V_2O_5$ (4.32 mole) and 3,730.9 grams $MoO_3$ (25.92 mole) were suspended in 4.0 liters distilled water with moderate stirring. 330.5 grams 85.4% (w/w) $H_3PO_4$ (2.88 mole) was added, the mixture was diluted to a total volume of 8.5 liters with an additional 4.5 liters of distilled water, and the stirring mixture was heated to reflux. The mixture was maintained at reflux for 7 days, after which it was cooled to room temperature, the stirring was stopped, and the undissolved solids were allowed to fall for 24 hours. The burgundy-red supernatant solution was decanted from a yellow residue. Repeatedly, the residue was suspended in water, the suspension was centrifuged, and the supernatant was decanted. These wash supernatants were combined with the original supernatant and the resulting solution was clarified by vacuum filtration. The volume of the solution was adjusted with distilled water to a total volume of 9.60 liters.

The yellow residue was dried to constant mass over $P_2O_5$ dessicant under vacuum. The dry mass was 203.39 grams and was determined to be essentially completely $V_2O_5$ by quantitative elemental analyses for P, Mo, and V. This is about 25% of the $V_2O_5$ introduced to the reaction and intended for incorporation into the product. Accordingly, the vanadium content of the polyoxoacid solution was determined by difference as 0.668 gram-atoms per liter, and the composition of this solution is designated 0.280M $\{H_{5.4}PMo_{9.6}V_{2.4}O_{40}\}$+0.0195M $H_3PO_4$.

This example demonstrates that the process disclosed in U.S. Pat. No. 4,156,574 for incorporation of $V_2O_5$ starting material into free phosphomolybdovanadic acids becomes more severe as the desired vanadium content of the product phosphomolybdovanadic acid is increased.

Example 14
Preparation of 0.30M $\{Na_{1.2}H_{4.8}PMo_9V_3O_{40}\}$

Preparation of an aqueous 0.30M $\{H_6PMo_8V_3O_{40}\}$ solution from stoichiometric quantities of $H_3PO_4$, $V_2O_5$, and $MoO_3$ in water was attempted by adapting the method described in U.S. Pat. No. 4,146,574, analogous to the preparation of $\{H_{4.9}PMo_{10.1}V_{1.9}O_{40}\}$ solution in Example 13. However, $Na_2CO_3$ was ultimately added to achieve complete incorporation of the $V_2O_5$ into the polyoxoanion solution, as described below. The overall equation for the synthesis became as follows:

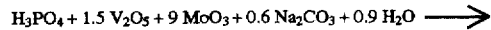

163.69 grams granular $V_2O_5$ (0.9 mole) and 777.28 grams $MoO_3$ (5.4 mole) were suspended in 3.0 liters distilled water in a Morton flask with moderate stirring. 68.85 grams 85.4% (w/w) $H_3PO_4$ (0.60 mole) was added, the mixture was diluted to a total volume of 6.0 liters with an additional 2.73 liters of distilled water, and the stirring mixture was heated to reflux. The mixture was maintained at reflux for 7 days, after which it was cooled to room temperature, the stirring was stopped, and the undissolved solids were allowed to fall for two days. The burgundy-red supernatant solution was removed from a yellow residue (ca. 50 grams, composed principally of $V_2O_5$, corresponding to about 30% of the V2O5 supplied to the reaction).

The yellow residue was suspended in about 0.25 liters distilled water and the mixture was heated to about 60° C. 38.16 grams anhydrous $Na_2CO_3$ powder (0.36 moles) was slowly added in portions to the rapidly stirred mixture, causing $CO_2$ liberation and dissolution of the $V_2O_5$. The resulting mixture was heated at the reflux for 30 minutes, giving a brown-red, slightly turbid solution. Approximately 1 ml of 30% $H_2O_2$ was added dropwise to the solution which was then refluxed for an additional 60 minutes to ensure the decomposition of excess peroxide. The orange sodium metavanadate solution was cooled to room temperature, clarified by vacuum filtration, then combined with the original supernatant solution in the Morton flask.

The entire solution was heated to reflux for about 2 hours, then cooled to room temperature. The volume of the solution was reduced to about 1.8 liters by rotating-film evaporation at 50° C. under vacuum. The homogeneous, dark burgundy-red solution was volumetrically diluted with distilled water to a total volume of 2.0 liters, giving 0.30M $\{Na_{1.2}H_{4.8}PMo_9V_3O_{40}\}$.

This example demonstrates that the limitations of the process disclosed in U.S. Pat. No. 4,146,574 for $V_2O_5$ incorporation into polyoxoanions can be overcome by converting some of the $V_2O_5$ into a soluble vanadate salt (sodium metavanadate) and producing a phosphomolybdovanadate partial salt solution instead of a phosphomoybdovanadic free acid solution. By this procedure, essentially all starting material was incorporated into the product solution.

Example 15

Preparation of 0.30M $\{Li_{1.15}H_{5.85}PMo_8V_4O_{40}\}$

Preparation of an aqueous 0.30M $\{H_7PMo_8V_4O_{40}\}$ solution from stoichiometric quantities of $H_3PO_4$, $V_2O_5$, and $MoO_3$ in water was attempted by adapting the method described in U.S. Pat. No. 4,146,574, analogous to the preparation of $\{H_{4.9}PMo_{10.1}V_{1.9}O_{40}\}$ solution in Example 13. However, $Li_2CO_3$ was ultimately added to achieve complete the incorporation of the $V_2O_5$ into the polyoxoanion solution, as described below. The overall equation for the synthesis became as follows:

$H_3PO_4 + 2 V_2O_5 + 8 MoO_3 + 0.575 Li_2CO_3 + 1.425 H_2O \longrightarrow$

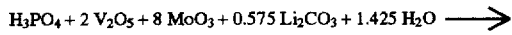

$Li_{1.15}H_{5.85}PMo_8V_4O_{40} + 0.575 CO_2\uparrow$ 218.26 grams granular $V_2O_5$ (1.20 mole) and 690.91 grams $MoO_3$ (4.80 mole) were suspended in 2.3 liters distilled water in a Morton flask with moderate stirring. 68.85 grams 85.4% (w/w) $H_3PO_4$ (0.60 mole) was added, the mixture was diluted to a total volume of 6.0 liters with an additional 3.44 liters of distilled water, and the stirring mixture was heated to reflux. The mixture was maintained at reflux for 7 days, after which it was cooled to room temperature, the stirring was stopped, and the undissolved solids were allowed to fall for two days. The burgundy-red supernatant solution was decanted from a yellow residue (composed principally of $V_2O_5$). Repeatedly, the residue was suspended in water, the suspension was centrifuged, and the supernatant was decanted. These wash supernatants were combined with the original and returned to the Morton flask.

The $V_2O_5$ residue was transferred into another flask with about 0.5 liters distilled water and the mixture was heated to about 60° C. 25.49 grams $Li_2CO_3$ chips (0.60 moles) was slowly added in portions to the rapidly stirred mixture, causing $CO_2$ liberation and dissolution of the $V_2O_5$. The resulting mixture was heated at the reflux for 60 minutes, giving a brown-red, slightly turbid solution. Approximately 1 ml of 30% $H_2O_2$ was added dropwise to the solution which was then refluxed for an additional 60 minutes to ensure the decomposition of excess peroxide. The orange lithium vanadate solution was cooled to room temperature, clarified by vacuum filtration, and added to the original supernatant solution in the Morton flask.

The entire solution was heated to reflux for about 3 hours, then cooled to room temperature. The volume of the solution was reduced to about 1.8 liters by rotating-film evaporation at 50° C. under vacuum. The homogeneous, dark burgundy-red solution was volumetrically diluted with distilled water to a total volume of 2.0 liters, giving 0.30M $\{Li_{1.15}H_{5.85}PMo_8V_4O_{40}\}$.

This example again demonstrates that the limitations of the process disclosed in U.S. Pat. No. 4,146,574 for $V_2O_5$ incorporation into polyoxoanions can be overcome by converting some of the $V_2O_5$ into a soluble vanadate salt (sodium metavanadate) and producing a phosphomolybdovanadate partial salt solution instead of a phosphomoybdovanadic free acid solution.

Example 16

Preparation of 0.20M $\{Na_{2.4}H_{4.6}PMo_8V_4O_{40}\}$

Preparation of this phosphomolybdovanadate partial salt solution followed the general procedure described in Example 15, wherein a free phosphomolybdovanadic acid preparation according to the method disclosed in U.S. Pat. No. 4,146,574 is followed by dissolution of the residual $V_2O_5$ with $Na_2CO_3$ and reintroduction of the resulting $NaVO_3$ to the preparation. In this case, excess $Na_2CO_3$ was used to set a desired product partial salt composition. The overall equation for the synthesis became as follows:

$H_3PO_4 + 2 V_2O_5 + 8 MoO_3 + 1.2 Na_2CO_3 + 0.8 H_2O \longrightarrow$

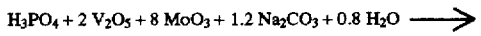

$Na_{2.4}H_{4.6}PMo_8V_4O_{40} + 1.2 CO_2\uparrow$ 291.04 grams granular $V_2O_5$ (1.60 mole) and 921.3 grams $MoO_3$ (6.40 mole) were suspended in 4.0 liters distilled water in a Morton flask with moderate stirring. 91.81 grams 85.4% (w/w) $H_3PO_4$ (0.80 mole) was added, the mixture was diluted to a total volume of 8.0 liters with an additional 3.66 liters of distilled water, and the stirring mixture was heated to reflux. The mixture was maintained at reflux for 7 days, after which it was cooled to room temperature, the stirring was stopped, and the undissolved solids were allowed to fall for two days. The burgundy-red supernatant solution was decanted from a yellow residue (composed principally of $V_2O_5$). The residue was suspended in water in about 0.5 liter distilled water and the mixture was heated to about 60° C. 101.75 grams granular $Na_2CO_3$ (0.96 moles) was slowly added in portions to the rapidly stirred mixture, causing $CO_2$ liberation and dissolution of the $V_2O_5$. The resulting mixture was heated at the reflux for 30 minutes, giving a dark red solution. This solution was added to the original supernatant solution in the Morton flask and the entire solution was heated to reflux for about 2 hours. The solution was then cooled to room temperature and clarified by vacuum filtration. The volume of the solution was reduced to less than 4.0 liters by rotating-film evaporation at 50° C. under vacuum. The homogeneous, dark burgundy-red solution was volumetrically diluted with distilled water to a total volume of 4.0 liters, giving 0.20M $\{Na_{2.4}H_{4.6}PMo_8V_4O_{40}\}$.

Example 17 (Comparative)

Preparation of 0.30M $\{Na_pH_{(5-p)}PMo_{10}V_2O_{40}\}$ solution with $-log\ [H^+]=1.00$ using sulfuric acid An aqueous solution comprising 0.30M $\{Na_pH_{(5-p)}PMo_{10}V_2O_{40}\}$ was prepared from $Na_3PO_4$, $MoO_3$, $V_2O_5$, $Na_2CO_3$, and $H_2SO_4$ generally following the method of the Matveev patents' Example 5 (designated $H_5[PMo_{10}V_2O_{40}]$ therein), with the following modifications:

27.28 grams granular $V_2O_5$ (0.15 mole) and 215.91 grams $MoO_3$ (1.50 mole) were suspended in 0.75 liter distilled water at about 60° C. in a beaker. 37.02 grams $Na_3PO_4 \cdot 12H_2O$ (0.15 mole) was added to the rapidly stirring mixture, followed by 23.85 grams granular $Na_2CO_3$ (0.225 mole), which was slowly added in portions, causing $CO_2$ liberation. The beaker was covered with a watchglass and the mixture was boiled for 90 minutes, resulting in a dark burgundy-red solution. The watch glass was removed and the solution was boiled uncovered an additional 90 minutes to reduce its volume to about 0.5 liter. The solution was then cooled to room temperature, and its hydrogen ion concentration was measured to be $-log\ [H^+]=5.2$. 96% (w/w) $H_2SO_4$ was added in portions to the stirring solution to adjust its $-log\ [H^+]$ to 1.10, requiring 8.47 milliliters (0.153 mole). The solution was then boiled uncovered for 60 minutes, cooled to room temperature, and clarified by vacuum filtration to remove a small amount of brown solid. It was then volumetrically diluted with distilled water to a total volume of 0.500 liter. Its $-\log [\text{H}^+]$ was readjusted to 1.00 by adding 0.14 milliliter 96% (w/w) $H_2SO_4$. The total amount of sulfuric acid added into the solution was 0.155 mole.

This example demonstrates that the provision of a sum of sodium cations in solution in excess of the sum of vanadium plus three times phosphorus results in a solution having a hydrogen ion concentration less than $10^{-5}$ prior to the addition of the sulfuric acid.

Example 18
Preparation of solid hydrous $\{Na_3H_3PMo_9V_3O_{40}\}$ 1.0 liter of 0.30M $\{Na_3H_3PMo_9V_3O_{40}\}$ (Example 7) was volumetrically transferred into a flask of known weight and evaporated to visual dryness by rotating-film evaporation at 50° C. under vacuum. The solid in the flask was then further dried under pump vacuum for several days. The mass of the solid in the flask, containing all 0.30 mole of the salt, was then 586.1 g, corresponding to an equivalent weight (per P) of 1954 grams/mole. The water content of the solid was calculated as the difference between this equivalent weight and the formula weight for the salt (1759 grams/mole anhydrous salt). Accordingly the solid was $\{Na_3H_3PMo_9V_3O_{40}\}\cdot10.8H_2O$.

This example demonstrates the simple preparation of solid phosphomolybdovanadate salts by simple evaporation of aqueous phosphomolybdovanadate salt solutions prepared the inventive process, which are free of acids or salts other than of the phosphomolybdovanadate. The yield of the solid is quantitative, all the way from the starting materials used to prepare the phosphomolybdovanadate salt solution. The solid's composition is precisely known from simple volumetric (aqueous solution) and gravimetric (solid product) measurements. Solids corresponding to many other exemplified phosphomolybdovanadate salt solutions were readily obtained by this simple procedure.

The present inventions have been shown by both description and exemplification. The exemplification is only exemplification and cannot be construed to limit the scope of the invention. Persons of ordinary skill in the art will envision equivalents to the inventive solutions and processes described by the following claims which are within the scope and spirit of the claimed invention.

We claim as our invention:

1. A process for preparing an acidic aqueous solution consisting essentially of dissolved phosphomolybdovanadate salt and essentially free of acids and salts other than of phosphomolybdovanadate, consisting essentially of:

dissolving in water an oxide, oxoacid, oxoanion salt, or mixtures thereof of each one of phosphorus, molybdenum, and vanadium, including at least one oxoanion salt of one of phosphorus, molybdenum, and vanadium, at conditions sufficient for their reaction to form phosphomolybdovanadate salt, wherein the sum of the moles of vanadium and the moles of molybdenum in the solution is about twelve times the moles of phosphorus in the solution, the sum of salt cationic charges does not exceed the sum of the phosphomolybdovanadate anionic charges in the solution, and the ratio of salt cationic charges to phosphomolybdovanadate anionic charges is effective for the hydrogen ion concentration of the aqueous solution to be greater than $10^{-5}$ mole per liter.

2. The process of claim 1 wherein said oxide, oxoacid, or oxoanion salt of vanadium is a vanadium oxoanion salt.

3. The process of claim 2 wherein said vanadium oxoanion salt is a metavanadate salt.

4. The process of claim 3 wherein said oxide, oxoacid, or oxoanion salt of phosphorus is phosphoric acid and said oxide, oxoacid, or oxoanion salt of molybdenum is molybdenum trioxide.

5. The process of claim 1, 2, 3 or 4 wherein the ratio of salt cationic charges to phosphomolybdovanadate anionic charges is effective for the hydrogen ion concentration of the aqueous solution to be greater than $10^{-3}$ mole per liter.

6. The process of claim 1, 2, 3 or 4 wherein the ratio of salt cationic charges to phosphomolybdovanadate anionic charges is effective for the hydrogen ion concentration of the aqueous solution to be greater than 0.10 mole per liter.

7. A process for preparing an acidic aqueous solution consisting essentially of dissolved phosphomolybdovanadate salt and essentially free of acids and salts other than of phosphomolybdovanadate, consisting essentially of:

dissolving in water a) an oxide, oxoacid, oxoanion salt, or mixtures thereof of each one of phosphorus, molybdenum, and vanadium and b) a carbonate salt, bicarbonate salt, hydroxide salt or mixtures thereof, at conditions sufficient for their reaction to form phosphomolybdovanadate salt, wherein the sum of the moles of vanadium and the moles of molybdenum in the solution is about twelve times the moles of phosphorus in the solution, the sum of salt cationic charges does not exceed the sum of the phosphomolybdovanadate anionic charges in the solution, and the ratio of salt cationic charges to phosphomolybdovanadate anionic charges is effective for the hydrogen ion concentration of the aqueous solution to be greater than $10^{-5}$ mole per liter.

8. The process of claim 7 wherein said oxide, oxoacid, or oxoanion salt of vanadium is vanadium pentoxide.

9. The process of claim 8 wherein said oxide, oxoacid, or oxoanion salt of phosphorus is phosphoric acid and said oxide, oxoacid, or oxoanion salt of molybdenum is molybdenum trioxide.

10. The process of claim 7 wherein said oxide, oxoacid, or oxoanion salt of vanadium is an oxoanion salt.

11. The process of claim 10 wherein said vanadium oxoanion salt is a metavanadate salt.

12. The process of claim 11 wherein said oxide, oxoacid, or oxoanion salt of phosphorus is phosphoric acid and said oxide, oxoacid, or oxoanion salt of molybdenum is molybdenum trioxide.

13. The process of claim 7, 8, 9, 10, 11 or 12 wherein the ratio of salt cationic charges to phosphomolybdovanadate anionic charges is effective for the hydrogen ion concentration of the aqueous solution to be greater than $10^{-3}$ mole per liter.

14. The process of claim 7, 8, 9, 10, 11 or 12 wherein said ratios are effective for the hydrogen ion concentration of the aqueous solution to be greater than 0.10 mole per liter.

15. A process for preparing a solid phosphomolybdovanadate salt essentially free of acids and salts other than of phosphomolybdovanadate, consisting essentially of:

dissolving in water an oxide, oxoacid, oxoanion salt, or mixtures thereof of each one of phosphorus, molybdenum, and vanadium, including at least one oxoanion salt of one of phosphorus, molybdenum, and vanadium, at conditions sufficient for their reaction to form phosphomolybdovanadate salt, wherein the sum of the moles of vanadium and the moles of molybdenum in the solution is about twelve times the moles of phosphorus in the solution and the sum of salt cationic charges does not exceed the sum of the phosphomolybdovanadate anionic charges in the solution; and evaporating the aqueous solution to recover essentially all the dissolved phosphomolybdovanadate salt in solid form.

16. The process of claim 15 wherein said oxide, oxoacid, or oxoanion salt of vanadium is a vanadium oxoanion salt.

17. The process of claim 16 wherein said vanadium oxoanion salt is a metavanadate salt.

18. The process of claim 17 wherein said oxide, oxoacid, or oxoanion salt of phosphorus is phosphoric acid and said oxide, oxoacid, or oxoanion salt of molybdenum is molybdenum trioxide.

19. A process for preparing a solid phosphomolybdovanadate salt essentially free of acids and salts other than of phosphomolybdovanadate, consisting essentially of:

dissolving in water a) an oxide, oxoacid, oxoanion salt, or mixtures thereof of each one of phosphorus, molybdenum, and vanadium and b) a carbonate salt, bicarbonate salt, hydroxide salt or mixtures thereof, at conditions sufficient for their reaction to form phosphomolybdovanadate salt, wherein the sum of the moles of vanadium and the moles of molybdenum in the solution is about twelve times the moles of phosphorus in the solution and the sum of salt cationic charges does not exceed the sum of the phosphomolybdovanadate anionic charges in the solution; and evaporating the aqueous solution to recover essentially all the dissolved phosphomolybdovanadate salt in solid form.

20. The process of claim 19 wherein said oxide, oxoacid, or oxoanion salt of vanadium is vanadium pentoxide.

21. The process of claim 20 wherein said oxide, oxoacid, or oxoanion salt of phosphorus is phosphoric acid and said oxide, oxoacid, or oxoanion salt of molybdenum is molybdenum trioxide.

22. The process of claim 19 wherein said oxide, oxoacid, or oxoanion salt of vanadium is an oxoanion salt.

23. The process of claim 22 wherein said vanadium oxoanion salt is a metavanadate salt.

24. The process of claim 23 wherein said oxide, oxoacid, or oxoanion salt of phosphorus is phosphoric acid and said oxide, oxoacid, or oxoanion salt of molybdenum is molybdenum trioxide.

* * * * *